(12) United States Patent
Schneider et al.

(10) Patent No.: US 7,050,423 B2
(45) Date of Patent: May 23, 2006

(54) MULTISERVICE USE OF NETWORK CONNECTION CAPABILITY

(75) Inventors: Marco Schneider, Austin, TX (US); Philip Cunetto, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 674 days.

(21) Appl. No.: 09/993,652

(22) Filed: Nov. 27, 2001

(65) Prior Publication Data

US 2002/0071427 A1    Jun. 13, 2002

Related U.S. Application Data

(63) Continuation-in-part of application No. 09/633,865, filed on Aug. 7, 2000.

(51) Int. Cl.
H04L 12/66    (2006.01)
H04L 12/28    (2006.01)
G06F 15/16    (2006.01)

(52) U.S. Cl. ............... 370/352; 370/392; 370/395.21; 709/203; 709/227

(58) Field of Classification Search ............... 370/352, 370/395.2, 230, 231, 354, 356, 389, 401, 370/295.2; 709/249, 200
See application file for complete search history.

(56) References Cited

U.S. PATENT DOCUMENTS

| | | |
|---|---|---|
| 4,494,231 A | 1/1985 | Slawy et al. |
| 5,051,982 A | 9/1991 | Brown et al. |
| 5,274,643 A | 12/1993 | Fisk |
| 5,490,141 A | 2/1996 | Lai et al. |
| 5,610,969 A | 3/1997 | McHerry et al. |
| 5,764,645 A | 6/1998 | Bernet et al. |
| 5,828,838 A | 10/1998 | Downs et al. |
| 5,842,040 A | 11/1998 | Hughes et al. |
| 5,892,924 A | 4/1999 | Lyon et al. |
| 5,905,726 A | 5/1999 | Cupta |
| 5,920,562 A | 7/1999 | Christie et al. |
| 5,923,740 A | 7/1999 | Ito et al. |
| 5,943,337 A | 8/1999 | Sasagawa et al. |
| 5,953,338 A | 9/1999 | Ma et al. |
| 5,956,334 A | 9/1999 | Chu et al. |

(Continued)

FOREIGN PATENT DOCUMENTS

EP    0961519    12/1999

(Continued)

OTHER PUBLICATIONS

"Telcos to Open ATM SVC Floodgate," by Brian Riggs, which was published Mar., 1997, pp. 1-3, <www.lantimes.com>.

(Continued)

Primary Examiner—Alpus H. Hsu
Assistant Examiner—Lina Yang
(74) Attorney, Agent, or Firm—Greenblum & Bernstein, P.L.C.

(57) ABSTRACT

Method and apparatus for a distributed switching system supporting a plurality of services. A service request is initiated by an initiating customer. The service request is then executed using, for example, a user-to-network interface setup. A terminating setup is then performed to either accept or reject the requested service. Multiple service requests are correlated with respective services to enable at least one appropriate policy and logic. Data related to the requested service is obtained using at least one of a push procedure, a pull procedure, a query procedure, and a procedure in which requests are associated with the issuance of certificates

9 Claims, 12 Drawing Sheets

U.S. PATENT DOCUMENTS

| | | | |
|---|---|---|---|
| 5,970,064 A | 10/1999 | Clark et al. | |
| 5,974,048 A | 10/1999 | Godse et al. | |
| 5,991,301 A | 11/1999 | Christie | |
| 5,999,514 A | 12/1999 | Kato | |
| 5,999,518 A | 12/1999 | Nattkemper et al. | |
| 5,999,532 A | 12/1999 | Terasaki | |
| 6,028,924 A | 2/2000 | Ram et al. | |
| 6,028,933 A | 2/2000 | Heer et al. | |
| 6,031,840 A | 2/2000 | Christie et al. | |
| 6,032,118 A | 2/2000 | Tello et al. | |
| 6,035,405 A | 3/2000 | Gage et al. | |
| 6,041,056 A | 3/2000 | Bigham et al. | |
| 6,041,109 A | 3/2000 | Cardy et al. | |
| 6,073,160 A | 6/2000 | Grantham et al. | |
| 6,081,518 A | 6/2000 | Bowman-Amuah | |
| 6,094,437 A | 7/2000 | Loehndorf, Jr. et al. | |
| 6,097,720 A | 8/2000 | Araujo et al. | |
| 6,097,722 A | 8/2000 | Graham et al. | |
| 6,118,785 A | 9/2000 | Araujo et al. | |
| 6,137,793 A | 10/2000 | Gorman et al. | |
| 6,141,339 A | 10/2000 | Kaplan et al. | |
| 6,148,074 A | 11/2000 | Miloslavsky et al. | |
| 6,167,432 A | 12/2000 | Jiang | |
| 6,169,735 B1 | 1/2001 | Allen, Jr. et al. | |
| 6,181,693 B1 | 1/2001 | Maresca | |
| 6,219,348 B1 | 4/2001 | Allen, Jr. et al. | |
| 6,222,842 B1 | 4/2001 | Sasyan et al. | |
| 6,229,810 B1 | 5/2001 | Gerszberg et al. | |
| 6,252,857 B1 | 6/2001 | Fendick et al. | |
| 6,289,001 B1 | 9/2001 | Smyk | |
| 6,292,495 B1 | 9/2001 | Von Hammerstein et al. | |
| 6,298,043 B1 | 10/2001 | Mauger et al. | |
| 6,345,048 B1 | 2/2002 | Allen, Jr. et al. | |
| 6,345,051 B1 | 2/2002 | Gupta et al. | |
| 6,366,577 B1 * | 4/2002 | Donovan | 370/352 |
| 6,366,948 B1 | 4/2002 | Teibel | |
| 6,373,930 B1 | 4/2002 | McConnell et al. | |
| 6,389,011 B1 | 5/2002 | Allen, Jr. et al. | |
| 6,400,716 B1 | 6/2002 | Munakata et al. | |
| 6,434,612 B1 | 8/2002 | Hughes et al. | |
| 6,473,427 B1 | 10/2002 | Brodigan | |
| 6,473,430 B1 | 10/2002 | Sreedharan et al. | |
| 6,529,479 B1 | 3/2003 | Suzuki | |
| 6,542,475 B1 | 4/2003 | Bala et al. | |
| 6,563,835 B1 | 5/2003 | Chen | |
| 6,597,689 B1 | 7/2003 | Chiu et al. | |
| 6,618,381 B1 | 9/2003 | Miyamoto et al. | |
| 6,621,793 B1 * | 9/2003 | Widegren et al. | 370/230.1 |
| 6,633,569 B1 | 10/2003 | Hemmady | |
| 6,636,516 B1 | 10/2003 | Yamano | |
| 6,741,585 B1 | 5/2004 | Munoz et al. | |
| 6,801,508 B1 | 10/2004 | Lim | |
| 6,804,247 B1 | 10/2004 | Saayan et al. | |
| 6,807,174 B1 | 10/2004 | Bernstein et al. | |
| 6,822,962 B1 | 11/2004 | Noake et al. | |
| 6,842,449 B1 * | 1/2005 | Hardjono | 370/352 |
| 6,859,457 B1 | 2/2005 | Tanaka | |
| 6,870,841 B1 | 3/2005 | Brown et al. | |
| 6,928,167 B1 | 8/2005 | Maeda et al. | |
| 6,937,595 B1 | 8/2005 | Barzegar et al. | |
| 6,937,598 B1 | 8/2005 | Hagirahim et al. | |
| 2001/0026553 A1 | 10/2001 | Gallant et al. | |
| 2002/0010866 A1 | 1/2002 | MacCullough et al. | |
| 2002/0024954 A1 | 2/2002 | Cunetto et al. | |
| 2002/0071472 A1 | 6/2002 | Dickson | |
| 2002/0126674 A1 | 9/2002 | Hemmady et al. | |
| 2002/0143959 A1 | 10/2002 | El-Baze et al. | |
| 2002/0150110 A1 | 10/2002 | Inber et al. | |
| 2002/0156914 A1 | 10/2002 | Lo et al. | |
| 2003/0016676 A1 | 1/2003 | Allen et al. | |
| 2003/0031184 A1 | 2/2003 | Cunetto et al. | |
| 2003/0128698 A1 | 7/2003 | Darland et al. | |
| 2003/0133454 A1 * | 7/2003 | Gallant et al. | 370/395.1 |
| 2004/0107238 A1 * | 6/2004 | Orton et al. | 709/200 |

FOREIGN PATENT DOCUMENTS

| | | |
|---|---|---|
| EP | 1316177 | 6/2003 |
| JP | 8-186580 | 7/1996 |
| WO | 98/26627 | 6/1998 |
| WO | 99/30530 | 6/1999 |
| WO | 98/36612 | 8/2000 |
| WO | 98/37727 | 8/2000 |
| WO | 00/62496 | 10/2000 |
| WO | 02/12977 | 2/2002 |
| WO | 03/009528 | 1/2003 |

OTHER PUBLICATIONS

"Voice Over ATM Switched Virtual Circuits on the Cisco MC3810", pp. 1-5, <www.cisco.com>.

"Do You Need Frame-to-ATM SVC", by Steve Taylor et al., which was published Jun., 2000, pp. 1-2,<www.nwfusion.com>.

"SIP Extensions for Media Authorization," by W. Marshall et al., dated Feb. 2001, pp. 1-23, <draft-ietf-sip-call-auth-01.txt>.

"SIP Extensions for Media Authorization," by W. Marshall et al., dated Nov. 2000, pp. 1-25, <draft-ietf-sip-call-auth-00.txt>.

cnfport: Configure Port—PXM1E, Cisco MGX 8830, MGX 8850 (PXM45 and PXM1E), and MGX 8950 Command Reference, Release 3, Part No. 78-14789-01 Rev. B0, Jan. 2003, p. 2-299.

"dspport: Display Port—PXM1E", Cisco MGX 8830, MGX 8850 (PXM45 and PXM1E), and MGX 8950 Command Reference, Release 3, Part No. 78-14789-01 Rev. B0, Jan. 2003, p. 2-749.

"Ipsilon's General Switch Management Protocol Specification: The Internet Society, 1998", version 2, by Newman et al., The Internet Society, Network Working Group, 1998, pp1-79.

Yager, C., "White Paper: Cisco Asymmetric Digital Subscriber Line Services Architecture", Cisco Systems, published on Jul. 3, 2000.

Printout of a website entitled "Abstract—Security for Asynchronous Transfer Mode (ATM) Networks", WPI Department of Electrical and Computer Engineering, last modified on Apr. 23, 1996.

Printout of a website entitled "ATM Security VPN Case Study", by Winkelstein, Celotek Corporation.

Clark et al., "Bandwidth-on-Demand Networks—A Solution to Peer-to-Peer File Sharing", BT Technology Journal, vol. 20, No. 1, Jan., 2002, pp. 53-63.

Loeser et al., "Distributed Video on Demand Services on Peer to Peer Basis", 1st International Workshop on Real Time LANs in the Internet Age, Jun. 18, 2002, pp. 1-4, http://www.hurray.isep.ipp.pt/rtlia2002/full_papers/20_rtlia.pdf.

"Efficient Routing of Packets for Multi-Media, Peer to Peer Applications", IBM Technical Disclosure Bulletin, May, 1994, pp. 459-460.

"Method for the Conversion of Multimedia Streams to Packet Streams", IBM Technical Disclosure Bulletin, Jun., 1994, pp. 95-98.

Bauer et al., "The Personal Router", The Eight ACM International Conference on Mobile Computing and Networking, Sep. 23-28, 2002, p. 1.

"User Interface Design for Videoconferencing Entries", IBM Technical Disclosure Bulletin, Apr., 1994, pp. 539-540.

Clark et al., "The Personal Router Whitepaper", MIT Laboratory for Computer Science, Version 2.0, Mar., 2001, http://ana.lcs.mit.edu/anaweb/PDF/PR_whitepaper_v2.pdf.

P.W. Reece et al., "The Broadband Call Control Demonstrator—A Platform for ITU-T, DAVIC and TINA-C Implementations", BT Technology Journal, vol. 16, No. 2, Apr. 1, 1998, pp. 155-168.

Sihui Shou et al., "Efficient Location Management for Hybrid Wireless ATM Networks; Architecture and Performance Analysis," 1999, IEEE, pp. 378-381.

* cited by examiner

MULTISERVICE USE OF NETWORK CONNECTION CAPABILITY

This application is a continuation-in-part of U.S. patent application Ser. No. 09/633,865, filed Aug. 7, 2000, entitled "Multiservice Use of Network Connection Capability Under User-to-Network Interface Signaling," to M. Schneider, et al., the disclosure of which is expressly incorporated by reference herein in its entirety.

BACKGROUND OF THE INVENTION

1. Field of the Invention

The present invention is directed to a distributed switching system, such as, for example, a multiservice switching system based on, for example, frame, cell or packet switching, that supports video, private line and data services.

2. Discussion of Background and Related Information

A multiservice switching system (MSS) includes a distributed switching device designed to support multiple forms of data, such as, for example, voice, computer data, digital data and video signals. Switching can be based on, for example, frame, cell or packet switching. Multiservice switching systems may use a broad range of access technologies, including, for example, time division multiplexing (TDM), digital subscriber lines (xDSL), wireless, and cable modems.

For example, in an asynchronous transfer mode (ATM) switched virtual circuit (SVC) service, an SVC customer can either initiate or terminate an SVC service request via a user-to-network (UNI) interface. The SVC customer may be, but is not limited to, for example, an individual subscriber, an enterprise network, an Internet service provider (ISP), or a peer network. Service policies define the capabilities and resources available to the customer. The service policies also determine whether a service request succeeds or fails.

The amount of data being transmitted between locations has rapidly escalated. Voice networks (e.g., traditional telephone networks) are becoming overwhelmed by the rapidly increasing traffic flow. Further, it is costly to construct/expand such traditional telephone networks. As a result, companies are searching for ways to carry voice services over packet networks, and for removing data traffic from the voice networks. This has led to the development of media gateways and media gateway controllers (referred to as distributed switches) that separate the service intelligence from the associated hardware, and allows voice and data to be carried over a packet network.

Conventional architectures do not permit the separation of a service controller from a transport controller. For example, in a conventional ATM switch, a calling party uses the UNI protocol to request an ATM SVC connection to another end system that is connected to the network. This request is carried by a signaling channel to an ATM edge switch, which terminates the UNI protocol and initiates a private network-network interface (PNNI) protocol to complete a setup across the network to the edge switch that connects to the called party. The application of policy and the decision to reject or accept a call is determined solely by an on-board processor within the switch. That is, service control is packaged into the switch. No standardized mechanism currently exists to utilize service control outside of the switch or other transport controller.

BRIEF DESCRIPTION OF THE DRAWINGS

The foregoing and other objects, features and advantages of the invention will be apparent from the following more particular description of embodiments, as illustrated in the accompanying drawings, which are presented as a non-limiting example, in which reference characters refer to the same parts throughout the various aspects of the invention, and wherein.

DETAILED DESCRIPTION OF EMBODIMENTS

Figure 1:
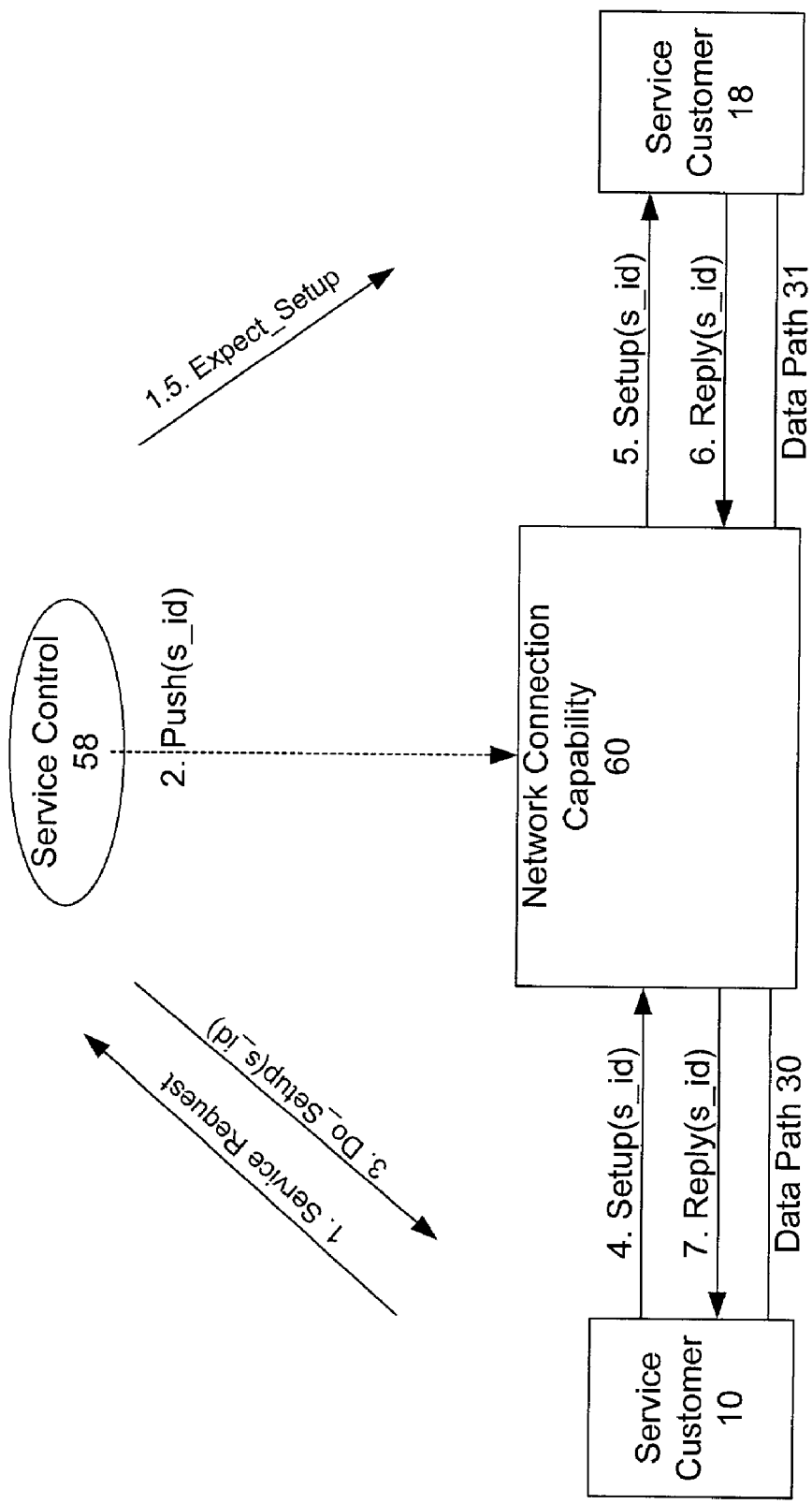
FIG. 1 illustrates an operation chart for a generic push method performed in accordance with the instant invention.

Accordingly, an object of the current invention is to provide a mechanism whereby a switch, such as, for example, an ATM switch, can access an external service control. In particular, the present invention allows multiple network services to share a network connection capability in such a way that a predetermined signal, such as, for example, UNI signaling, is interpreted via service specific controls (such as, for example, data, policies and transformations) contained within the network. This is achieved in a uniform manner, such that policies can be made globally available in the network. Further, user policy can be applied independent of the manner in which the user accesses the network.

According to an aspect of the present invention, a method and system are disclosed for switching multiple forms of data. A customer initiates a request for service. In response to the request, predetermined data related to the requested service is obtained, including policy and/or logic (e.g., a program), representing at least service capabilities or service permissions. If the requested service is permitted, the initiating customer is instructed to initiate a setup, interfacing with a network, identifying the requested service. Network connections are completed across a network in response to the setup, and a second interface setup is initiated to accept or reject the connection setup request, which is passed back to the initiating customer. Multiple service requests are correlated with respective services to enable at least one appropriate service policy and logic.

According to a feature of the invention, the predetermined data related to the requested service may be obtained using at least one of a push procedure that pushes the predetermined data into the network connection capability, a pull procedure that pulls the predetermined data into the network connection capability, a query (trigger) procedure that queries a service control module for at least related service permissions, and a certificate procedure that specifies permitted setup parameters and possibly service policy and/or logic via a certificate provided to the initiating user. In the push and pull procedures, the network connection capability makes a decision regarding the requested service based on the obtained information. In the query procedure, the network connection capability provides facts (e.g., the attempted network connection) to the service control, which makes a policy and/or logic decision and instructs the network connection capability accordingly.

Another aspect of the present invention provides a system for controlling access to a communications network associated with a network service. The system includes a service controller, including at least one session initiation protocol (SIP) proxy server, and at least one switching device. The service controller receives a request for the network service from an initiating end system and instructs the initiating end system to perform a connection setup request. The instructing includes specification of a unique identifier to be included in the connection setup request, the unique identifier correlating the connection setup request and the network service. The at least one switching device receives the connection setup request from the initiating end system and processes the connection setup request based on the unique identifier and at least one of service policy or logic associated with the network service.

The switching device also establishes a network connection to a terminating end system or rejects the connection setup request based on the processing, in accordance with the service policy and/or logic. In various embodiments of the invention, the at least one switching device may be an Internet protocol router, a multi-protocol label switching (MPLS) label switching router, an optical switching device controlled by generalized MPLS (GMPLS) or TDM switching device controlled by GMPLS. The connection setup request would be in accordance with resource reservation protocol (RSVP) for the IP router. The connection setup requests would be in accordance with RSVP-te or constraint-based routed label distribution protocol (CR-LDP) for the MPLS label switching router, the optical switching device and the TDM switching device.

The service controller may push the at least one of service policy and logic into the switching device prior to instructing the originating end system to perform a connection setup request. The connection setup request is then in accordance with RSVP, while the pushing of the service policy or logic into the switching device is in accordance with common open policy service-policy rule (COPS-PR) protocol. Alternatively, the switching device may pull the service policy and/or logic from the service controller after receiving the connection setup request from the initiating end system. The connection setup request is then in accordance with RSVP and the pulling of the service policy or logic is in accordance with common open policy service (COPS) protocol. Alternatively, the switching device may query the service controller and receive information representing application of the service policy and/or logic in response to the query. The connection setup request is in accordance with RSVP, and the query and response are in accordance with COPS.

Another aspect of the present invention provides a system for controlling access to a communications network associated with a network service. The system includes a service controller, including at least one SIP proxy server, and at least one switching device. The service controller receives a request for the network service from an initiating end system to access the network service, provides the initiating end system with an enabling certificate, and instructs the initiating end system to perform a connection setup request. The certificate includes at least one of service policy and logic associated with the network service and a unique setup identifier. The instruction to perform the connection setup request includes the certificate and the unique identifier.

The at least one switching device receives the connection setup request from the initiating end system, processes the connection setup request based on the certificate and the unique identifier, and either establishes a network connection or rejects the connection setup request based on the processing, in accordance with at least the certificate. In various embodiments of the invention, the at least one switching device may be an Internet protocol router, the connection setup request being in accordance with RSVP; a MPLS label switching router, the connection setup request being in accordance with RSVP-te or CR-LDP; an optical switching device controlled by GMPLS, the connection setup request being in accordance with RSVP-te or CR-LDP; or a TDM switching device controlled by GMPLS, the connection setup request being in accordance with RSVP-te or CR-LDP.

Another aspect of the present invention provides a method for controlling access to capabilities of an IP network associated with an IP network service. The method includes processing at a service control, in accordance with SIP, a request for the IP network service received from an initiating end system. The processing includes instructing the initiating end system to perform a connection setup request and specifying a unique identifier to be included in the connection setup request. The unique identifier correlates the connection setup request and the IP network service. At least one of policy and logic of the IP network service is transferred to at least one router from the service control. The connection setup request, including the unique identifier, is received from the initiating end system by the at least one router. The connection setup request is processed based on the unique identifier and the policy and/or logic associated with the IP network service. Either an IP network connection is established to a terminating end system or the connection setup request is rejected, based on the processing in accordance with the policy and/or logic.

The transferring or the policy and/or logic of the IP network service to the router may include pushing the policy and/or logic from the service control prior to instructing the initiating end system to perform the connection setup request. Alternatively, the transferring the policy and/or logic of the IP network service to the router may include pulling the policy and/or logic from the service control after instructing the initiating end system to perform the connection setup request. The connection setup request may be in accordance with RSVP.

Yet another aspect of the present invention provides a method for controlling access to capabilities of an IP network associated with an IP network service. The method includes processing at a service control, in accordance with SIP, a request for the IP network service received from an initiating end system. The processing includes instructing the initiating end system to perform a connection setup request and specifying a unique identifier to be included in the connection setup request, the unique identifier correlating the connection setup request and the IP network service. Information representing the application of at least one of policy and logic of the IP network service is transferred to at least one router from the service control. The router receives from the initiating end system the connection setup request, including the unique identifier. The connection setup request is processed based on at least the unique identifier and the information representing the application of the policy and/or logic associated with the IP network service. Either an IP network connection is established to a terminating end system or the connection setup request is rejected, based on the processing in accordance with the information representing the application of policy and/or logic. The transferring the information representing the application of the policy and/or logic of the IP network service to the router may include replying to a query from the router after instructing the initiating end system to perform the connection setup request. Also, the connection setup request may be in accordance with RSVP.

Another aspect of the present invention provides a method for controlling access to capabilities of an IP network associated with an IP network service. The method includes processing at a service control, in accordance with SIP, a request for the IP network service received from an initiating end system. The processing includes instructing the initiating end system to perform a connection setup request and specifying a unique identifier to be included in the connection setup request, the unique identifier correlating the connection setup request and the IP network service. A certificate is provided to the initiating end system, the certificate including at least one of policy of the IP network service, logic of the IP network service, and information representing at least one of the policy and the logic of the IP network service. The certificate and the connection setup request, including the unique identifier, is received from the initiating end system at the at least one router. The connection setup request is processed based on at least one of the certificate and the unique identifier. Either an IP network connection to a terminating end system is established or the connection setup request is rejected based on the processing. The connection setup request may be in accordance with RSVP.

The various aspects and embodiments of the present invention are described in detail below.

Four general procedures are discussed below for enabling enforcement of the service policy and/or logic, such that the service control is separate from the network connection control, in accordance with the present invention. It is understood that the invention is not limited to the four procedures discussed below, and thus, the four procedures should not be interpreted as limiting the scope of the invention; alternative procedures may be employed without departing from the scope and/or spirit of the invention.

In the first procedure, to be discussed in detail below, the requested service downloads (pushes) policy and/or logic into the network connection capability before requesting the end-user to do a network connection setup request. The network connection capability then determines whether to establish a requested connection based on the policy and/or logic. In the second procedure, to be discussed in detail below, the network connection capability pulls in policy and/or logic from the service after receiving a connection setup request or other signaling message. The network connection capability then determines whether to establish a requested connection based on the policy and/or logic. In the third procedure, to be discussed in detail below, the network connection capability queries the service when it receives a connection setup request or other signaling message. The service then determines whether the requested connection is permitted based on the policy and/or logic and informs the network connection capability accordingly. In the fourth procedure, to be discussed below in detail, the service sends the service customer an encrypted certificate that allows a connection setup request to go through without requiring interaction between the service and the network connection capability.

The network connection capability is able to map an incoming connection setup request to the corresponding service in the first through the third procedures (and possibly the fourth procedure). In the fourth procedure, the service provides the end-system with a (preferably non-reusable) certificate that allows it to do the permitted setup. The end-system of the fourth procedure includes the certificate in its setup message, so that a specific controller of the network connection capability does not have to consult with the service in order to determine whether to allow the setup. While the certificate is preferably encrypted with the permissions as well as a sequence number, this is not a requirement of the instant invention.

The first procedure will now be described, referring to FIG. 1. FIG. 1 depicts the first procedure implemented on an exemplary system that includes a first service customer 10 (e.g., the initiating end-user or end-system), a second service customer 18 (e.g., the terminating end-user or end-system), a network connection capability 60 and a service control 58. As previously discussed, the service customers 10 and 18 are not limited to individuals, and may include, for example, enterprise networks, ISPs and peer networks. The network connection capability 60 may include any compatible combination of equipment specific to the type of network through which a connection is controlled, such as conventional switches, routers and associated proxy controllers or servers (if any). The service control 58 may likewise include any type of controller or server capable of interfacing with at least the service customer 10. Further, the service control 58 may incorporate a distributed implementation, including multiple service controllers or servers. The arrows in FIG. 1 depict steps in the connection process.

According to the first procedure, the service control 58 downloads (pushes) service policy and/or logic into the network connection capability 60 before it requests the service customer 10 to perform a connection setup request. In accordance with this procedure, the network connection capability 60 maps the incoming setup to a corresponding service. This requires encoding a service instance unique identification (s_id), using known techniques, in the setup from the calling party.

In particular, at step 1 in FIG. 1, a service request is made to the service control 58. At step 1.5, the service control 58 sends an expect setup message to the service customer 18, which is an optional step. The expect setup message serves various functions, depending on the embodiment of the invention. For example, the expect setup message may enable pre-approval of the requested session, pursuant to the service request initiated by the service customer 10 at step 1. To enable pre-approval, the expect setup message includes a unique identifier, such as the s_id, so that the service customer 18 is able to correlate the session pre-approval with the connection setup message subsequently received at step 5, discussed below. The service customer 18 then communicates whether the session is pre-approved (not pictured) back to the service control 58. Alternatively, the expect setup message may simply provide transport specific information by which the service customer 18 may expect to receive the setup message at step 5. For example, in an ATM network implementation, the expect setup message of step 1.5 may identify the virtual path identifier/virtual channel identifier (VPI/VCI) in which the service customer 18 may expect an incoming setup message. However, in this alternative embodiment, the requested session is not pre-approved, so the setup message may ultimately be rejected by the service customer 18.

At step 2, the service control 58 pushes policy and/or logic to control the network connection capability 60. The push may occur before or after the expect setup message is sent to the service customer 18. Then, at step 3, the service control 58 requests that the service customer 10 initiate a connection setup request containing the s_id. The setup is directed from the customer 10 to the network connection capability 60 at step 4, and contains the s_id. Because multiple customers may initiate multiple connections corresponding to a single service, the s_id functions to identify the service and the connection instance for the particular customer.

Upon receiving the connection setup request and validating it according to the pushed service policy and/or logic from step 2, the network connection capability 60 sets up a network connection to the other edge. Thereafter, step 5 is performed to initiate a connection setup request to the service customer 18. At step 6, the service customer 18 replies to the network connection capability 60, providing connection data, which may include whether the setup request is accepted or rejected. The network connection capability informs the service customer 10 of the success of the setup request at step 7, which may also include data indicating whether the service customer 18 has accepted or rejected the setup request. When the setup request is successful, data paths 30 and 31 are established to connect the service customer 10 and the service customer 18 through the network connection capability 60. The data paths 30 and 31 accommodate voice traffic or data traffic, as dictated by the service application.

In order for the service customer 18 to map the incoming connection setup request to an application, either the setup contains an application identifier or the service control 58 alerts the service customer 18 to expect incoming setup, as discussed above with respect to step 1.5. If the application identifier and service identifier are the same, the s_id can be used. However, because this may not be the case, a different identifier is preferably used.

Figure 2:
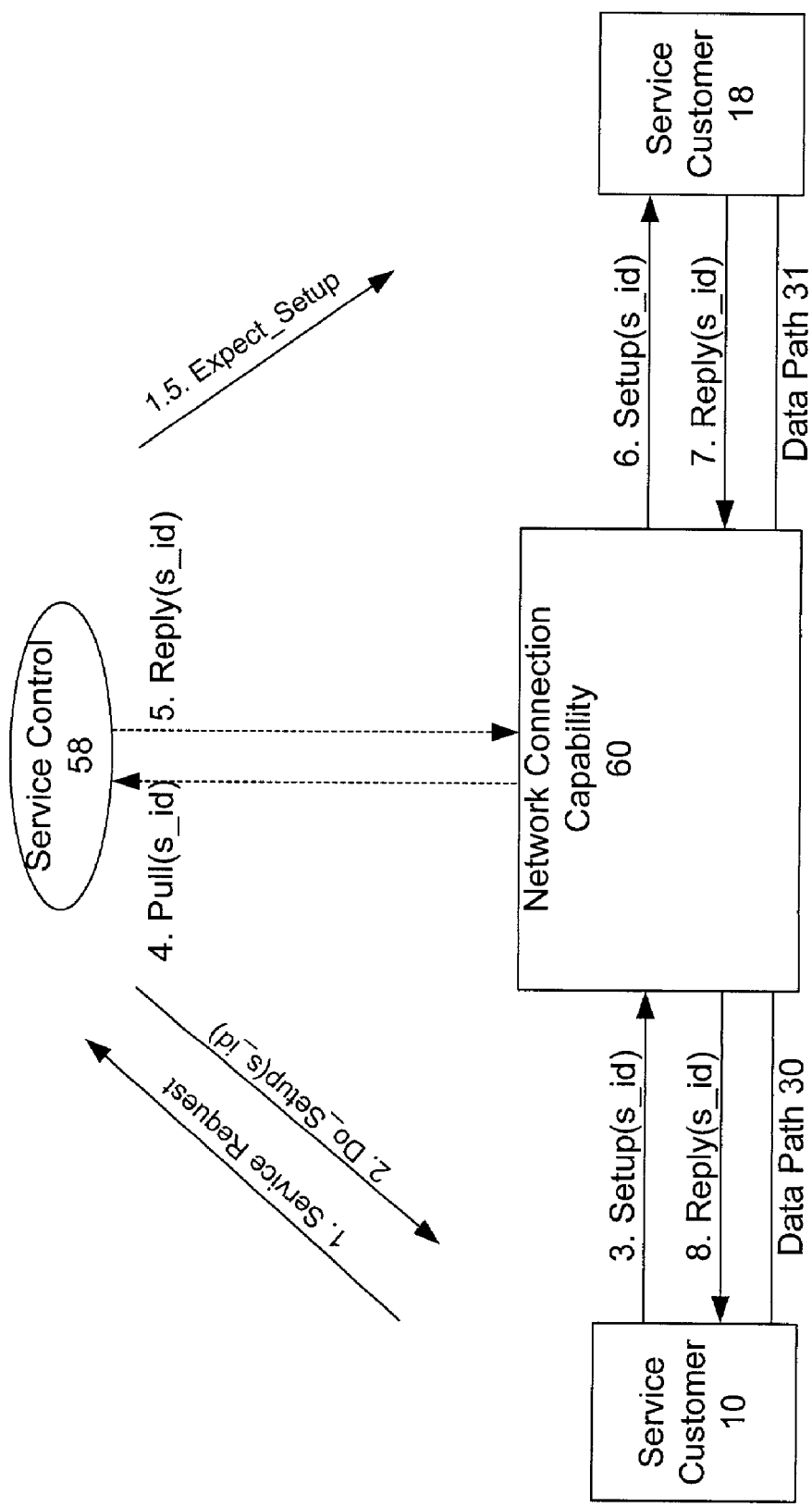
FIG. 2 illustrates an operation chart for a generic pull method performed in accordance with the instant invention.

The second procedure will now be described, referring to FIG. 2. In the second procedure, the network connection capability 60 pulls in service policy and/or logic in a manner similar to that described in the first procedure. At step 1, a service request is made to the service control 58 by the service customer 10. At step 1.5, the service control 58 may send an expect setup message to the service customer 18, as described with respect to FIG. 1, above. The service control 58 requests that the service customer 10 initiate a connection setup request at step 2, containing the s_id. The connection setup request is directed at step 3 from the service customer 10 to the network connection capability 60 and contains the s_id. Because multiple customers may initiate multiple connections corresponding to a single service, the s_id functions to identify the service and the connection instance for the particular customer. Step 4 is then performed, in which the network connection capability 60 pulls policy and/or logic from the service control 58, which is completed by the reply provided at step 5.

Upon receiving the connection setup request and validating it according to the pulled policy and/or logic from steps 4 and 5, the network connection capability 60 sets up a network connection to the other edge. Thereafter, step 6 is performed to initiate a connection setup request to the service customer 18. As described above, the service customer 10 is informed of the success of the connection request pursuant to reply steps 7 and 8. As a result, data paths 30 and 31 are established to connect the service customer 10 and the service customer 18 through the network connection capability 60.

As in the first procedure, the service control 58 may alert the service customer 18 of the incoming connection, for example, at step 1.5. Again an s_id may be used to alert the service customer 18, although another type of identifier is preferable.

Figure 3:
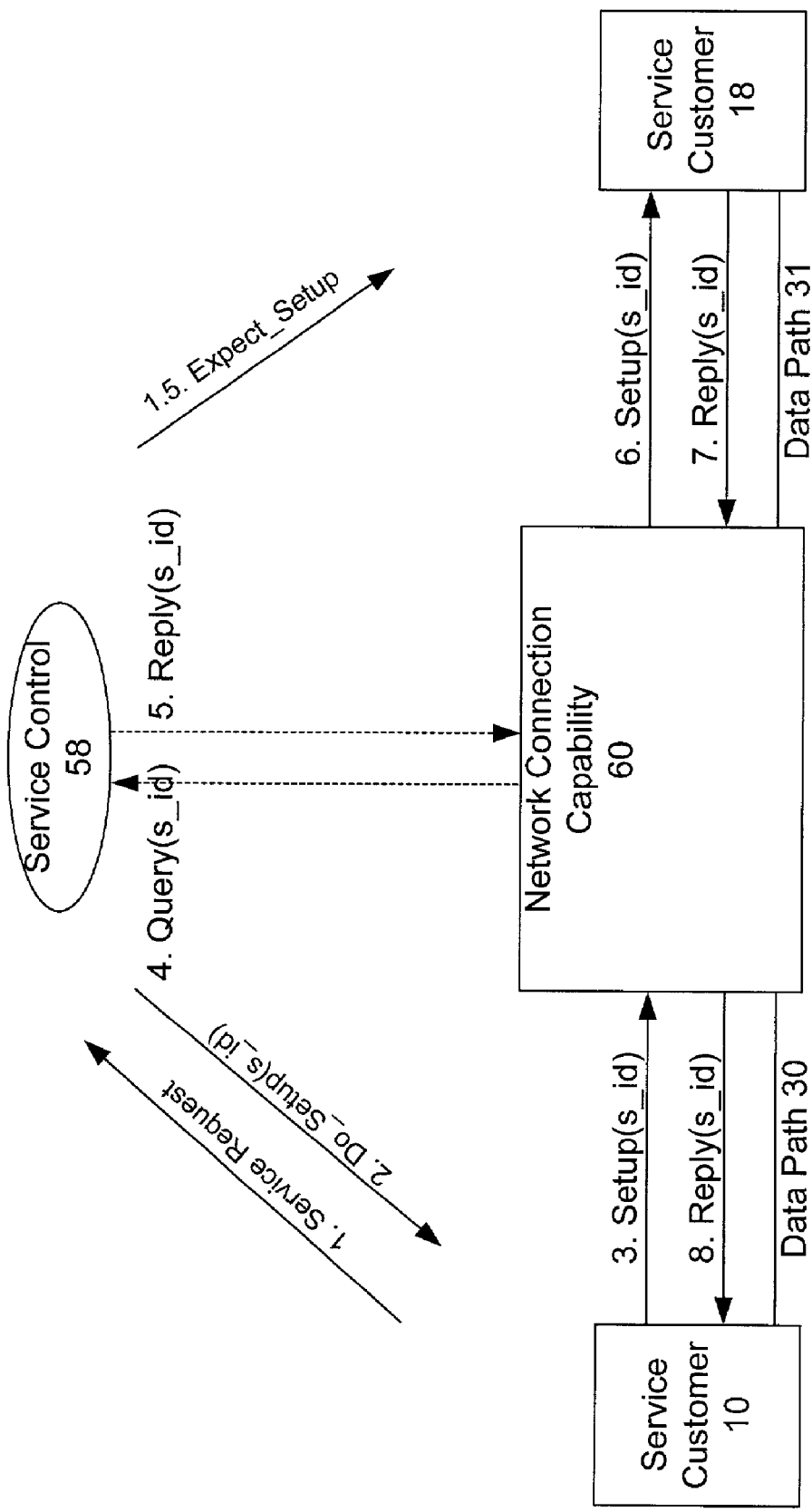
FIG. 3 illustrates an operation chart for a generic query method performed in accordance with the instant invention.

The third procedure will now be described, referring to FIG. 3. Because this procedure is similar to the pull procedure (e.g., the second procedure) described above, the following discussion is only directed to the differences between the two procedures. In the third procedure, an incoming setup message results in a query to an appropriate service control module (e.g., service control 58). Other queries, based on mid-call signaling events, for example, can also be defined.

The query procedure includes a query and a reply, indicated by steps 4 and 5, respectively. In response to the query of step 4, the service control 58 validates the connection setup request according to the policy and/or logic. The service control 58 then sends the reply to the network connection capability at step 5. The reply contains information indicating whether the setup should go through and under what conditions. However, unlike the second procedure (as well as the first procedure), the network connection capability 60 does not receive the service policy and/or logic. Therefore, in the third procedure, the service is not constrained by the capabilities of the network connection capability 60, which must interpret the service policy and/or logic in the first and second procedures.

In both the second and the third procedures, the interaction between the network connection capability 60 and the service control 58 must be timely, in order to avoid a time out condition on the connection setup request. Further, the s_id that uniquely identifies the service is needed in the setup.

The fourth procedure will now be described, referring to FIG. 4. In the fourth procedure, multiple services use the same network connection capability 60 without requiring any contemporaneous interaction between the service control 58 and the network connection capability 60. In accordance with this procedure, the service control 58 provides the service customer 10 with a certificate allowing it to perform a permitted setup. The certificate specifies permitted setup parameters and/or other policy and logic to be applied to the setup. The service customer 10 includes the certificate in its setup message. In this regard, the network connection capability 60 does not need to consult with the service control 58 in order to allow the setup. The certificate may uniquely identify which service allowed the setup, so that billing and accounting can be properly performed when this procedure is used with third parties.

While the following discussion indicates that the certificates are encrypted, the encryption may be omitted without departing from the spirit and scope of the invention. Furthermore, the certificate may contain the permissions and/or a sequence number. According to the disclosed fourth procedure, certificates are non-reusable. Further, because events may happen asynchronously, the certificates may not necessarily be used in the order that they are received.

With respect to encryption, each network service (s) has a private key (E.s) that is used to encrypt certificates. For each encryption key, the network connection capability 60 has a private decryption key (D.s). As a result, only the network connection capability 60 can read the certificate, and only the network service can have originally generated the certificate. Further, according to the disclosed procedure, each certificate is preferably encrypted with a unique sequence number in order to ensure that a previous certificate is not used again. When the network connection capability 60 decrypts a certificate, the network connection capability 60 examines the sequence number to determine whether the certificate has been seen before.

Keeping a record of every certificate (with associated sequence numbers) that has been received may require a large database. In order to minimize the size of this database, a preferred feature of the fourth procedure is to generate certificates in which subsequently generated certificates have increasing sequence numbers. As a result, the network connection capability 60 only needs to keep a limited size history (which changes over time) of previously seen certificates for each service. In addition, the size of the database that must be maintained can be further reduced by date-stamping (and/or time-stamping) the certificates in addition to assigning sequence numbers. If the date-stamped (and/or time-stamped) certificate exceeds a predetermined delta value (such as, for example, one day and/or one minute), the certificate (and the associated connection request) is rejected.

Figure 4:
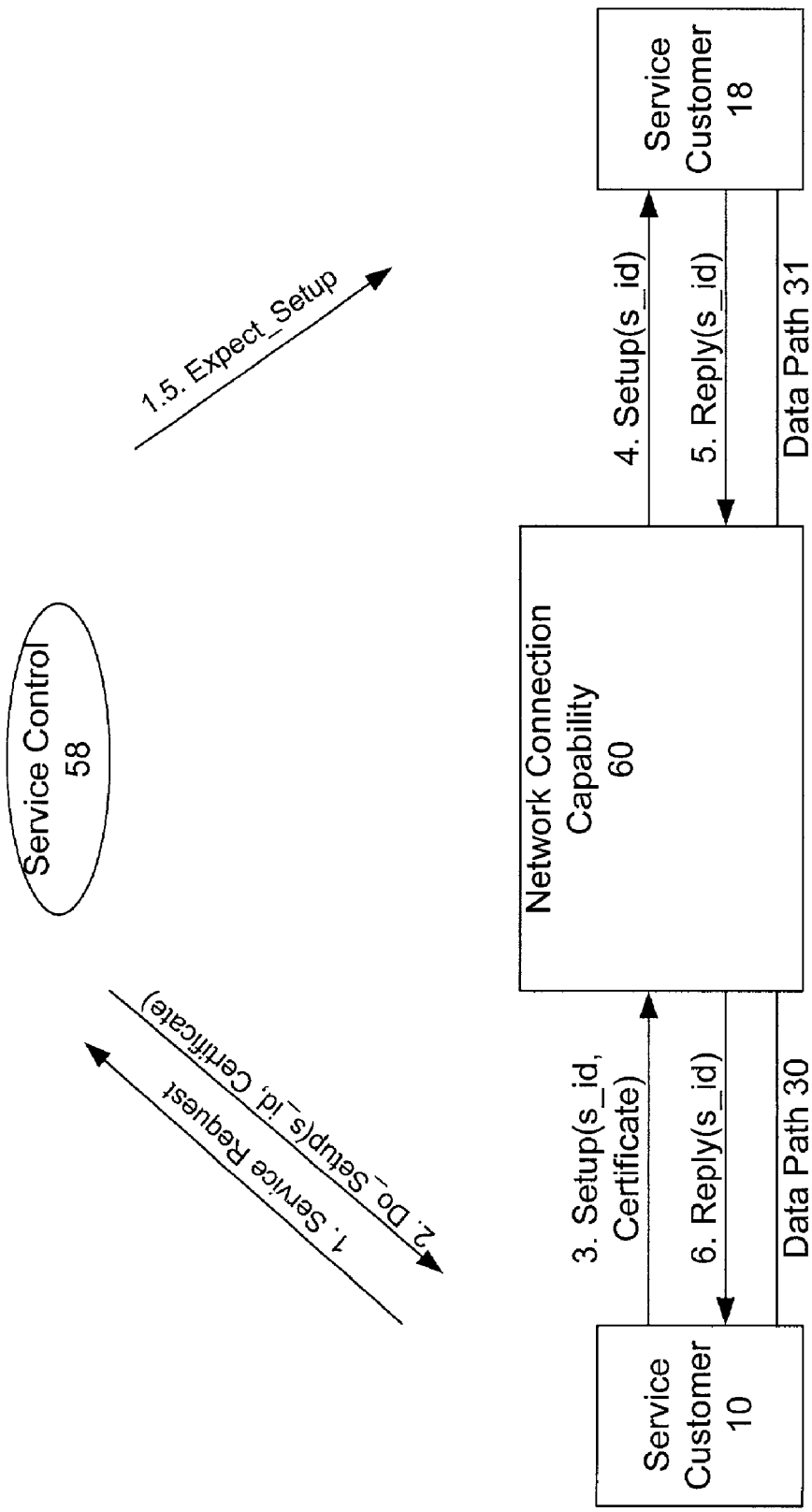
FIG. 4 illustrates an operation chart for a generic method using certificates performed in accordance with the instant invention.

Referring to FIG. 4, a service request is initially made to the service control 58 at step 1. In response, the service control 58 may send an expect setup message to the service customer 18 at step 1.5, as described with respect to FIG. 1, above. The service control 58 requests at step 2 that the service customer 10 initiate a connection setup request containing a s_id and a certificate as specified by the service control 58. The connection setup request (containing the s_id and the certificate) is directed from the service customer 10 to the network connection capability 60 at step 3.

Upon receiving the connection setup request and validating it according to the s_id and the certificate, the network connection capability 60 sets up a network connection to the other edge. Thereafter, step 4 is performed to initiate a connection setup request to the service customer. The service customer 10 is then informed of the success of the connection request pursuant to reply steps 5 and 6.

As in the first three procedures described above, the service control 58 may alert the service customer 18 of the incoming connection at step 1.5, for example. The alert may be performed using the s_id or some other unique identifier as appropriate for this purpose.

The discussion above illustrates certain procedures for achieving the network connection. As previously noted, the instant invention is not dependent upon the specific implementation described above. Consequently, other implementations may be utilized without departing from the spirit and/or scope of the invention.

It is noted that the push (download) procedure (e.g., the first procedure), as well as the certificate procedure (e.g., the fourth procedure), enables third party service providers to be connected by the Internet, whereas the other disclosed procedures may not. It is further noted that once the service policy and/or logic is pushed by the service control 58 (pursuant to the first procedure), it is locally available to a specific network connection capability controller that is used to implement the network connection capability. The service policy and/or logic can therefore be applied in real-time to setup messages; in other words, the network connection capability 60 does not need to wait to pull in the service policy and/or logic (pursuant to the second procedure) or to initiate a query to the service (pursuant to the third procedure). Further, the various procedures described above may be combined. For example, the push procedure may be combined with the pull procedure. In such a combination, a setup can operate to have the service control 58 optionally push the service policy and logic to the network connection capability 60. If, after receiving the setup from the service customer 10, the network connection capability 60 determines that it has not yet received the service policy and/or logic, it may then pull the service policy and/or logic from the service control 58. Alternatively (or in addition), queries in the query procedure can be placed on variables that represent the state of a call.

Figure 5:
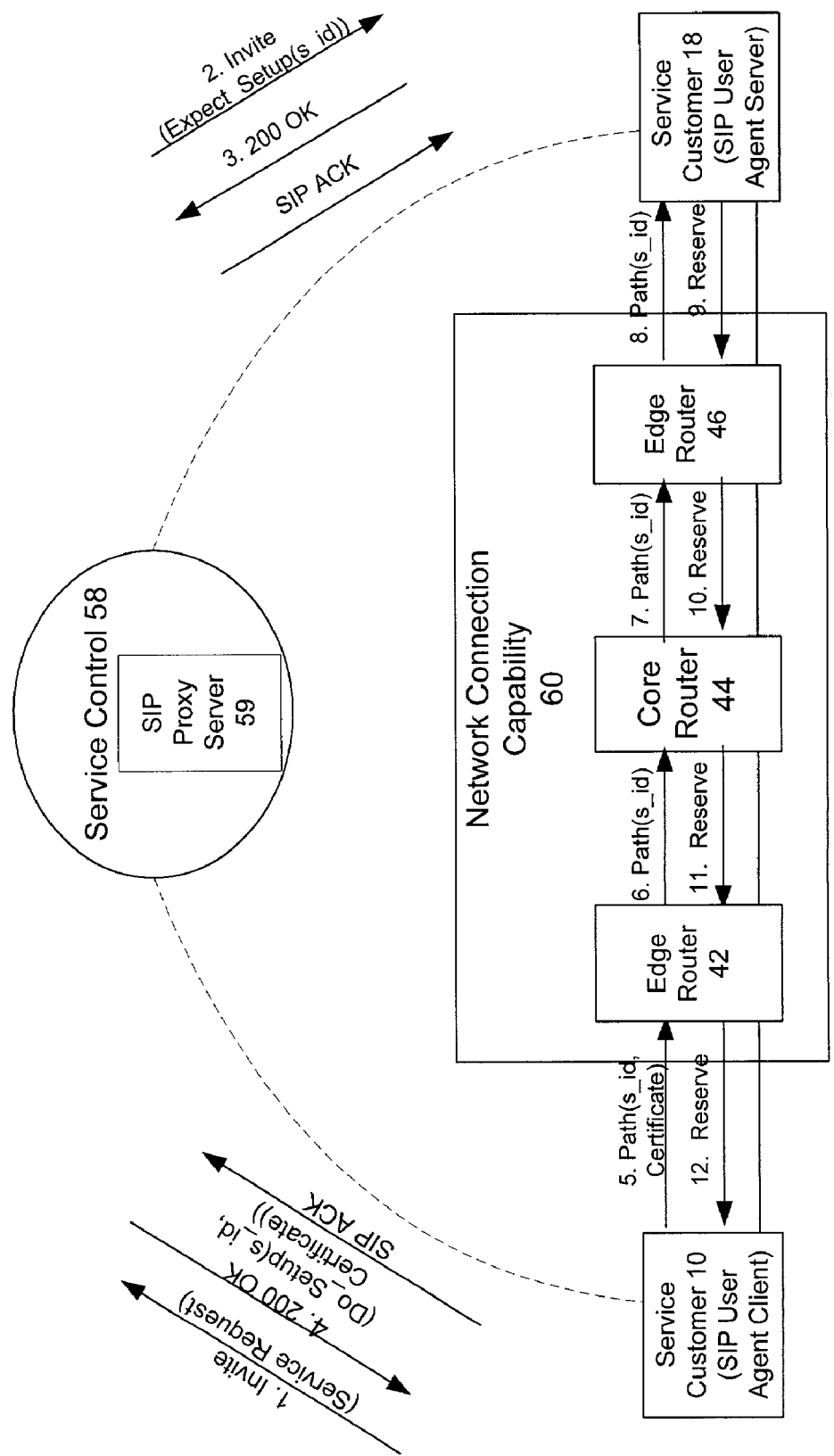
FIG. 5 illustrates an operation chart for a method using a certificate in an IP network performed in accordance with the instant invention.

The general procedures discussed with respect to FIGS. 1-4 may be implemented over any type of network connection capability, including, for example, frame, cell or packet switching networks, that supports video, private line and data services. For example, FIG. 5 depicts a more detailed exemplary implementation of the fourth procedure (e.g., the procedure certificate). In particular, FIG. 5 illustrates an implementation according to one embodiment of the invention based on an IP network, which utilizes session initiation protocol (SIP) for service signaling and resource reservation protocol (RSVP) for connection signaling. In this embodiment, service control 58 may be realized by a SIP proxy server 59. Accordingly, the service customer 10 acts as a SIP user agent client; the service customer 18 acts as a SIP user agent server; and the network connection capability 60 is realized by one or more IP routers running RSVP. In particular, the network connection capability 60 may include an edge router 42 that accepts RSVP signaling from the service customer 10 and an edge router 46 that accepts RSVP signaling from the service customer 18. The network connection capability may include additional routers that enable the connection across the network, such as core router 44. Note that, in the exemplary embodiment of FIG. 5, the network connection capability 60 is implemented using the same protocol (i.e., RSVP) that is used by the service customer 10 to request the network connection. However, in alternative embodiments of the invention, the network connection capability 60 and the service customer 10 may implement protocols, different from one another. In other words, FIG. 5 is for illustrative purposes only and the invention may be realized any number of other ways.

The elements involved in a successful call flow, resulting in a connection being established after a service request, are described in more detail, below. A service request is initially made to the service control 58 by the service customer 10 at step 1 using a SIP invite method with appropriate extensions. At step 2, the invite is passed from the service control 58 to the terminating service customer 18. When the service customer 18 accepts the invite, it responds with a 200 OK message at step 3. At step 4, the 200 OK is passed on to the initiating service customer 10, along with the s_id and the certificate from the service control 58. Steps 1–4 of FIG. 5 thus realize the general service request, expect_setup and do_setup steps (steps 1, 1.5 and 2, respectively) depicted in FIG. 4. SIP ACK messages are sent to the service customer 18 from the service customer 10 through the service control 58, completing the SIP call flow.

At step 5 of FIG. 5, RSVP is used to implement the connection setup request to the network connection capability 60. The connection setup request is realized by sending an RSVP path message, having the s_id and the certificate as additional parameters. The RSVP path message is received by the edge router 42 within the network connection capability 60. Upon receiving the connection setup request in the form of an RSVP path message, the edge router 42 validates the message according to the s_id and certificate, and initiates a network connection to the other edge of the network connection capability 60. For example, RSVP path messages are sent to the core router 44 and the edge router 46 at steps 6 and 7, respectively.

At step 8, an RSVP path message is used to realize the setup message to the service customer 18. At step 9, an RSVP reserve message is used to realize the reply message from the service customer 18 to the network connection capability 60. Likewise, RSVP reserve messages corresponding to RSVP path messages shown in steps 6 and 7 are generated as reply messages at steps 10 and 11. At step 12, an RSVP reserve message is used to realize a reply message to the initiating service customer 10. Data paths are thus established through the IP network to connect the service customer 10 and the service customer 18. In an actual implementation, additional well known RSVP signaling messages would occur in order to maintain the softstate.

Figure 6:
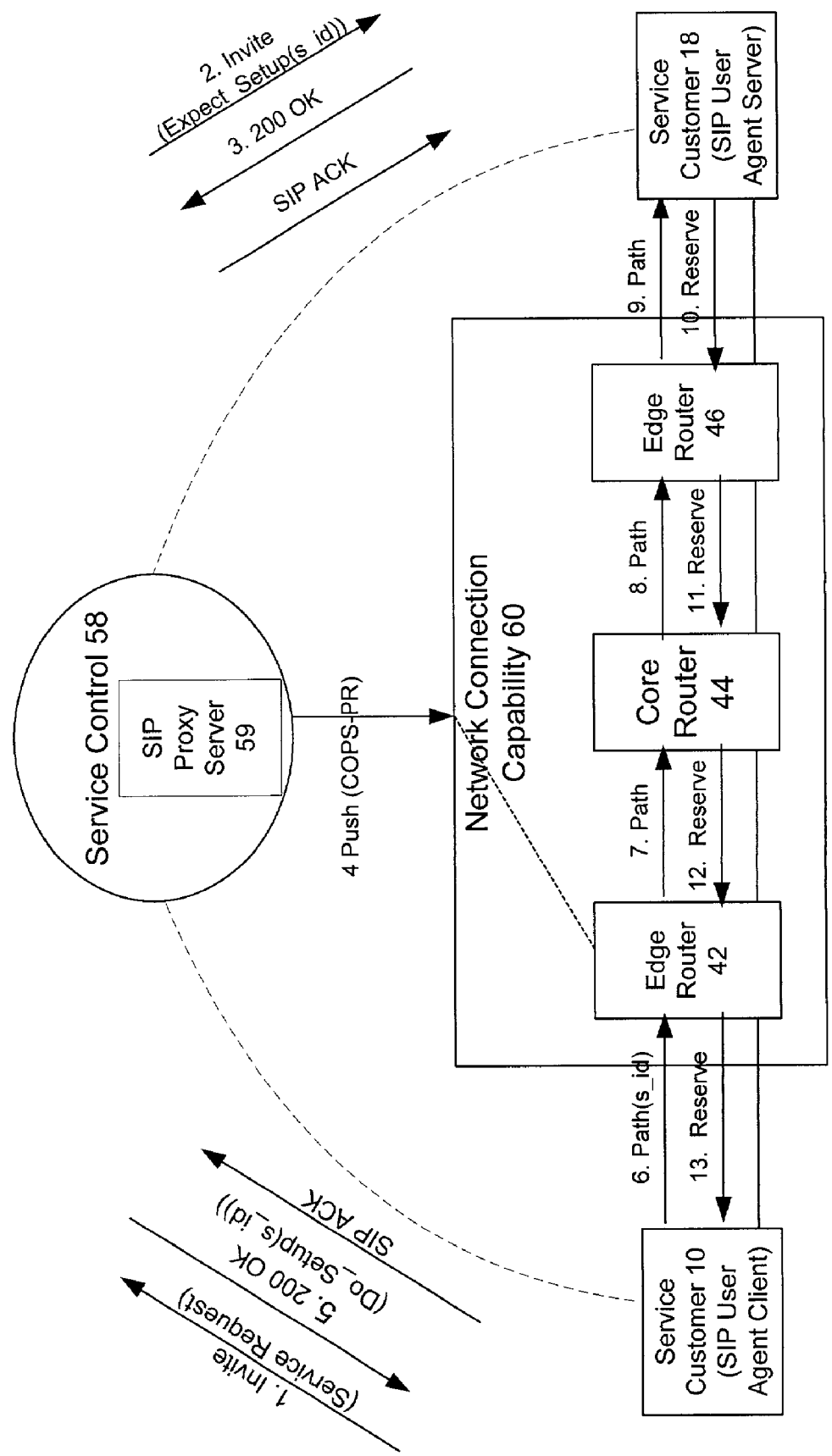
FIG. 6 illustrates an operation chart for a push method in an IP network performed in accordance with the instant invention.

As another specific example of the general procedures, FIG. 6 shows a more detailed exemplary implementation of the first procedure (e.g., the push procedure). In particular, FIG. 6 illustrates an implementation according to an embodiment of the invention over an IP network with SIP for service signaling, RSVP for connection signaling and common open policy service-policy rule (COPS-PR) protocol for realizing implementation of the push between the service control 58 and the network connection capability 60. (COPS protocol may be used in the pull and query methods.)

A service request is initially made to the service control 58 by the service customer 10 at step 1 using the SIP invite method with appropriate extensions. At step 2, the invite is passed from the service control 58 to the other service customer 18. When the service customer 18 accepts the invite, it responds with a 200 OK message at step 3. In response, the service control 58 pushes the service policy and/or logic to the network connection capability 60 at step 4, using COPS-PR. In this example, COPS-PR is run between the SIP proxy server 59 of the service control 58 and the edge router 42 in order to enable the push. At step 5, the 200 OK is passed on to the initiating service customer 10, along with the s_id from the service control 58. SIP ACK messages are sent to the service customer 18 from the service customer 10 through the service control 58, completing the SIP call flow.

At step 6, RSVP is used to implement the connection setup request to the network connection capability 60. The connection setup request is realized by sending an RSVP path message, having the s_id and the certificate as additional parameters. The RSVP path message is received by the edge router 42 within the network connection capability 60. Upon receiving the connection setup request in the form of an RSVP path message, the edge router 42 validates the message according to the pushed policy and/or logic that it received at step 4. When the message is determined to be valid, the edge router 42 initiates a network connection to the other edge of the network connection capability 60. For example, RSVP path messages are sent to the core router 44 and the edge router 46 at steps 7 and 8, respectively.

At step 9, an RSVP path message is used to realize the setup message to the service customer 18. At step 10, an RSVP reserve message is used to realize the reply message from the service customer 18 to the network connection capability 60. Likewise, RSVP reserve messages corresponding to the RSVP path messages shown in steps 7 and 8 are generated as reply messages at steps 11 and 12. At step 13, an RSVP reserve message is used to realize a reply message to the initiating service customer 10. Data paths are thus established through the IP network to connect the service customer 10 and the service customer 18. In an actual implementation, additional well known RSVP signaling messages would occur in order to maintain the softstate.

Figure 7:
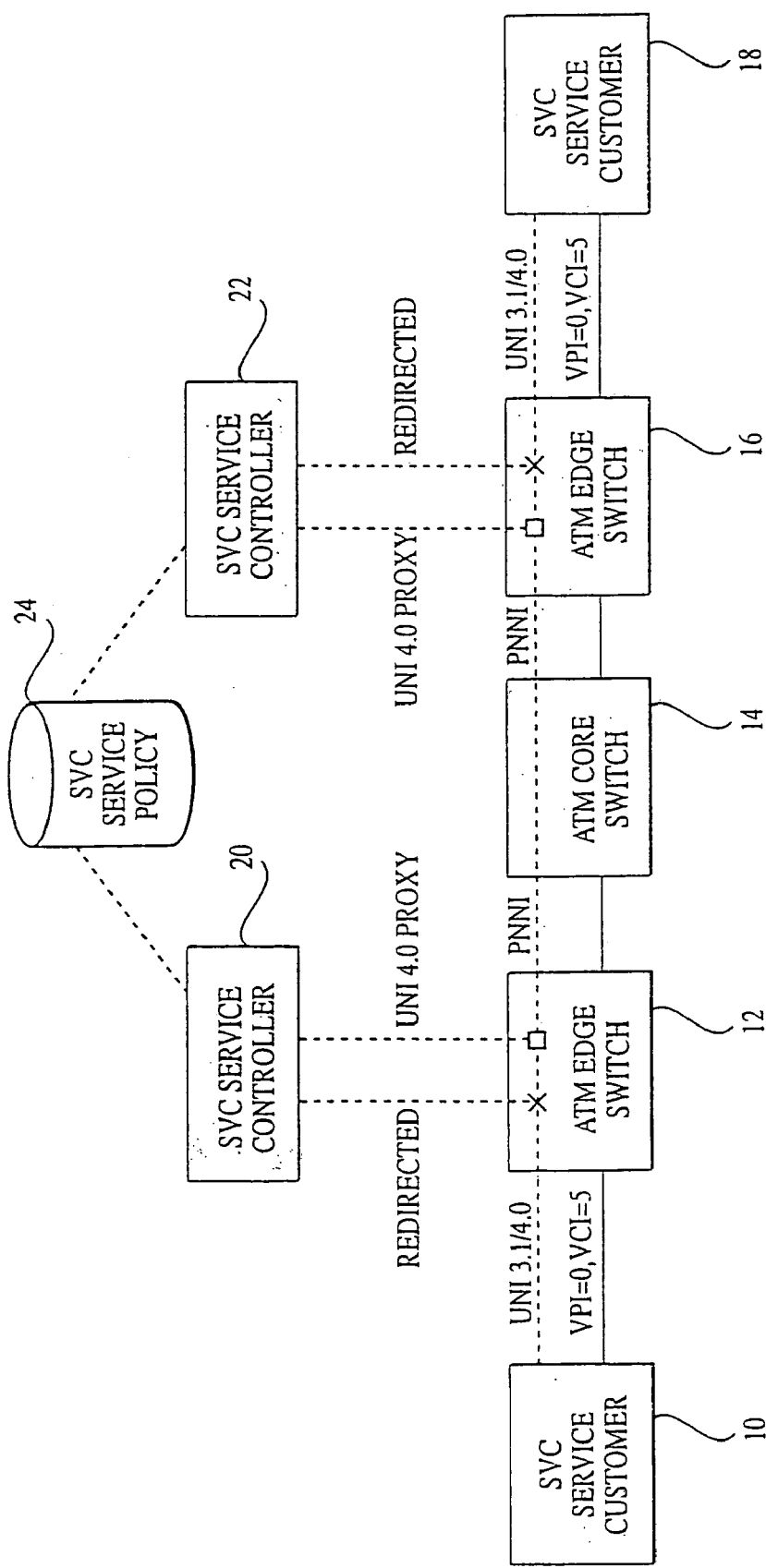
FIG. 7 illustrates an exemplary ATM SVC service that utilizes intelligence separate from conventional ATM switches that are useable with the present invention.

Alternative embodiments of the invention may be implemented over ATM networks, which utilize UNI for service signaling and PNNI for connection signaling, for example. FIG. 7 discloses an example ATM SVC service that can implement the present invention, including the initiating service customer 10, a first ATM edge switch 12, an ATM core switch 14, a second ATM edge switch 16, a terminating service customer 18, a first SVC service controller 20, a second SVC service controller 22, and a proxy device, such as, for example, an SVC service policy device 24. However, it is understood that modifications to this arrangement may be made without departing from the scope and/or spirit of the invention. Further, while the present invention is being described with reference to a UNI signal, it is understood that alternative signal protocols, such as RSVP, may be used without departing from the spirit and/or scope of the invention.

The service customer 10 initiates (or terminates) an SVC service request using UNI signaling. The service customer 10 may correspond to, for example, an individual subscriber, an enterprise network, an ISP or a peer network. In addition, an integrated services digital network (ISDN) to ATM gateway may also act on behalf of the service customer 10. Service policies define the capabilities and resources available to the service customer 10, and also determine whether a service request succeeds or fails. Example SVC service class capabilities include, but are not limited to, constant bit rate (CBT), real time variable bit rate (rt-VBR), non-real time variable bit rate (nrt-VBR), unspecified bit rate (UBR), available bit rate (ABR), calling line identification presentation and restriction (CLIP/CLIR). Example resources include, but are not limited to, for example, total bandwidth and total number of SVC's.

Figure 8:
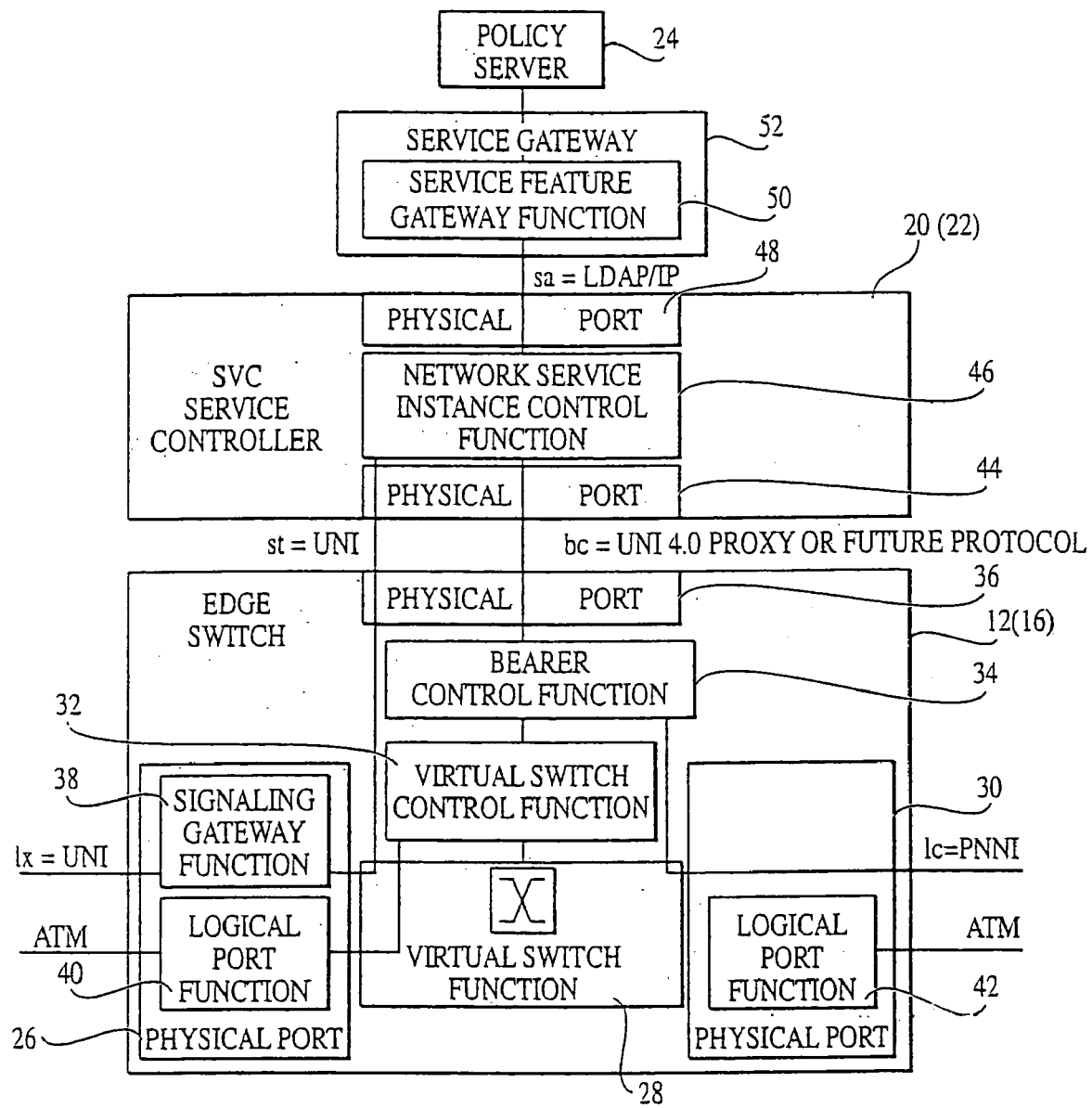
FIG. 8 illustrates a conventional ATM edge switch and conventional SVC service controller useable with the exemplary ATM SVC service of FIG. 7.

FIG. 7 illustrates the ATM SVC being implemented with conventional ATM switches that contain both bearer control and virtual switch control in addition to the switching function, the structure of which is shown in greater detail in FIG. 8. According to an exemplary embodiment of the present invention, the ATM SVC service control (e.g., the network service instance control function (NSICF)) is removed from a switching device (e.g., the ATM edge switch 12 or 16) and placed within a separate physical controller, although SVC service control may be integrated in the edge switches, as is well known. The bearer control and virtual switch control may be bundled together (as a switch controller) with switching as part of a single physical unit, and the NSICF is bundled separately as the SVC service controller. The UNI signaling is redirected from the edge switch 12 to the SVC service controller 20 via a permanent virtual circuit (PVC). This allows the SVC service controller 20 to apply policy and/or other transformations to UNI setup messages. If the SVC service controller 20 permits a setup, the SVC service controller 20 functions as a proxy agent for the service customer 10, in accordance with, for example, Annex 2 of ATM UNI Signaling Specification Version 4.0, and issues a UNI setup command to the ATM edge switch.

FIG. 8 illustrates a conventional ATM edge switch, such as ATM edge switch 12 (or ATM edge switch 16), which includes a first physical port 26, a virtual switch 28, a second physical port 30, a virtual switch controller 32, a bearer controller 34 and a third physical port 36. The first physical port 26 includes a signaling gateway 38 and a logical port 40, while the second physical port 30 includes a logical port 42. The SVC service controller 20 (or the SVC service controller 22) includes a first physical port 44, an NSICF 46 and a second physical port 48. As shown in FIG. 8, an optional service gateway 50 is interfaced between the SVC service controller 20 (or the SVC service controller 22) and the policy server 24.

It is noted that the construction and operation of the ATM edge switch 12, the SVC service controller 20 and the service gateway 50 is known to those skilled in the art. Thus, a detailed described of the structure and operation of these elements is omitted. It is further understood that variations in the construction of the ATM edge switch 12, the SVC service controller 20 and service gateway 50 may be made without departing from the scope and/or spirit of the invention.

In order to implement the ATM SVC service outside of the conventional switch, a UNI signaling channel, produced by an SVC service customer, is redirected to an SVC service controller by a PVC or S-PVC. The service customer 10, in particular, may correspond with an individual subscriber, connected by, for example, an xDSL connection, an ISDN connection (using, for example, an ISDN to ATM Internetwork gateway), an enterprise network, an ISP or a peer network. In the disclosed embodiment, policies are stored in the database 24 (e.g., policy server) that is physically separate from an individual service controller 20 (or the service controller 22). The database 24 is accessed by a service feature gateway function 52 associated with the service gateway 50. The policy server 24 checks policies of both the calling party and the called party.

While the policy server 24 is shown as being physically separate from the SVC service controllers, it is understood that variations in form, such as, for example, incorporating the policies in one or more SVC service controllers 20 or 22 may be made without departing from the spirit and/or scope of the invention.

The present invention discloses the use of a predetermined setup, such as, for example, UNI version 4.0 proxy, for the purpose of accessing bearer control. As a result, the NSICF 46 terminates the UNI stack. However, it is understood that different protocols (such as, for example, UNI version 3.1) may be used for accessing bearer control without departing from the scope and/or spirit of the invention.

Figure 9:
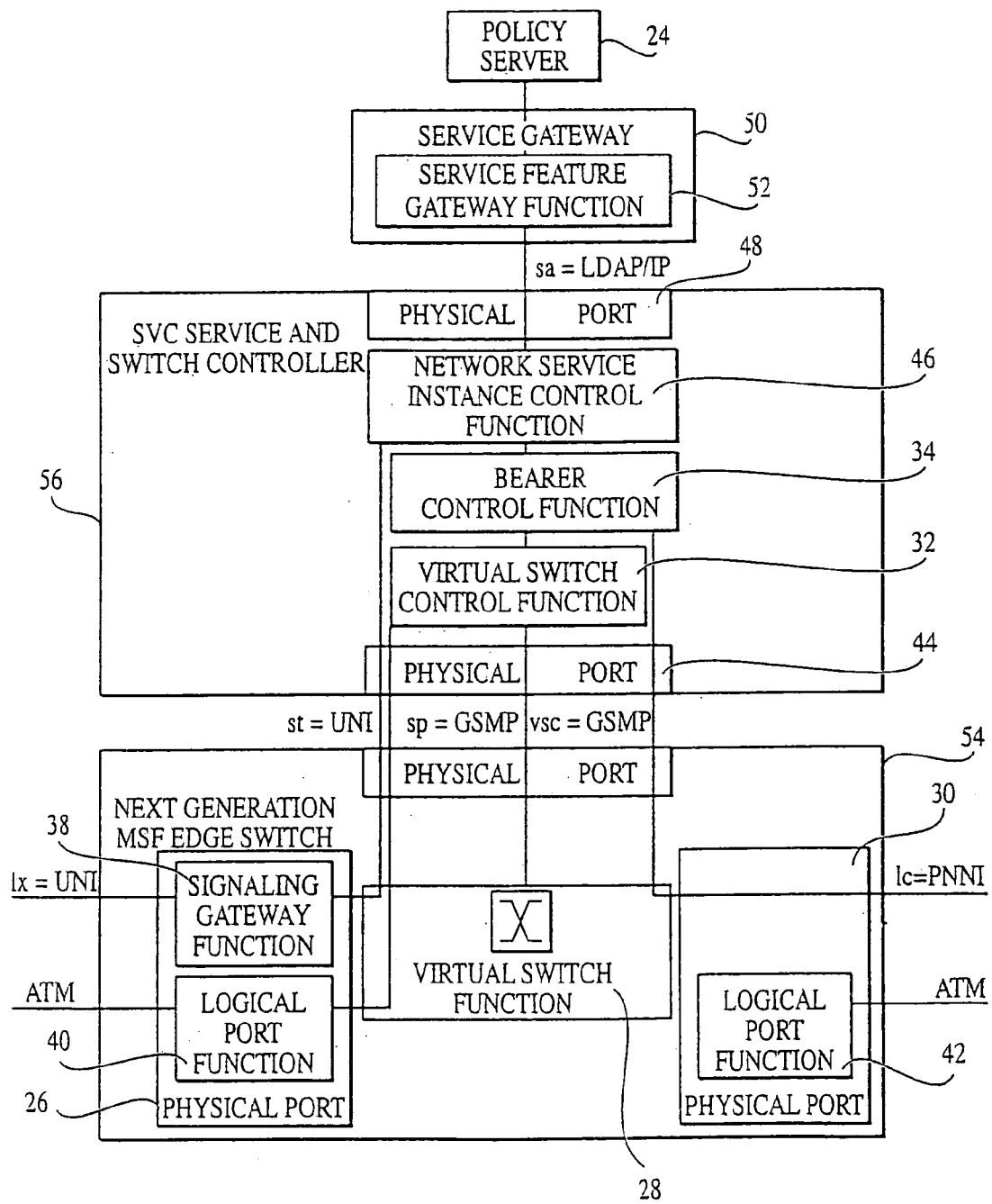
FIG. 9 illustrates a next generation ATM edge switch and virtual switch interface separation useable with an ATM SVC service.

FIG. 9 illustrates an example of an ATM switch, in which the ATM SVC service is implemented using a next generation Multiservice Switching Forum (MSF) ATM switch 54. In this regard, elements in this example that correspond to like elements in the first example are designated with the same element number. Further, a detailed discussion of such elements is not required.

In the second example, the virtual switch controller 32 and the bearer controller 34 are removed from the switch and are placed in a separate SVC service switch controller 56, along with the NSICF 46. Further, UNI signaling passes through the switch 54 and on to the NSICF 46 within the switch controller 56. It is noted that for purposes of simplification, FIG. 9 omits physical paths sp and vsc.

The NSICF 46 applies policy and screening to a UNI setup message based on a calling party and a called party, a requested service class, etc., via the service feature gateway function. If the setup message is successful, the NSICF 46 invokes the bearer control function 34 that resides within the switch controller 56 that provides access to the network's SVC capability. The signaling gateway 38 function is placed within the physical port to denote that the UNI signaling crosses the boundary from customer to network, and that it is being re-directed via a PVC to the NSICF. No policy is applied and the transport of the signaling does not change. The bearer control function 34 is implemented by initiating a PNNI protocol in the network direction in order to create a bearer connection across the network. Further, the logical port function is accessed via the virtual switch control function along sp to access this function.

It is noted that in a multiservice environment, service control is not limited to ATM SVC's. Other transport devices, such as, for example, frame relay and IP layered on top of ATM, may be used.

The present invention solves the problem of multiple services sharing the same network connection capability while utilizing a common UNI signaling method. In the following discussion, it is assumed that a calling party needs to access different network connection capabilities based on the services in which the calling party participates.

According to an embodiment of the instant invention, service customers access a service using either a dedicated signaling channel or a signaling network (which may optionally be IP based, as discussed above). During a service interaction, an ATM SVC connection must be established between customers (i.e., end-systems). Thus, one of the end-systems initiates a UNI setup. Once the UNI initiates the SVC's between the ATM SVC service and other services, the network connection capability correlates the calling party setup request with the service it belongs to, so that an appropriate policy is applied.

The end-systems, the service and the network connection capability must coordinate their actions. Specifically, the network connection capability must enable the enforcement of the service policy and/or logic (e.g., a program module) at least during the initial setup. In addition, the called party must be able to map an incoming UNI to the appropriate service/application.

Figure 10:
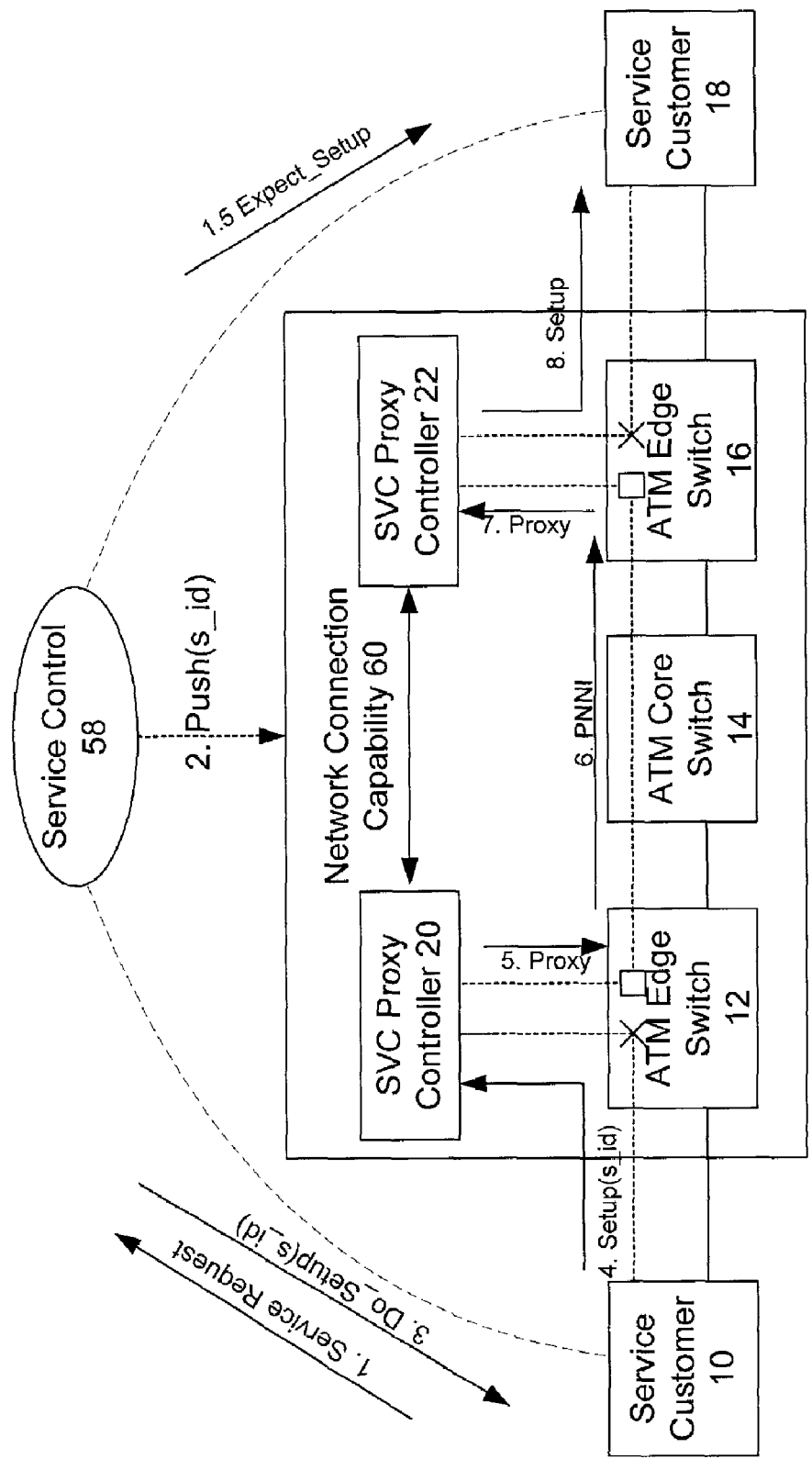
FIG. 10 illustrates an operation chart for a push method in an ATM network performed in accordance with the instant invention.

Accordingly, the general procedures described in relation to FIGS. 1–4 are specifically applied to enable ATM SVC services in FIGS. 10–13, respectively. Referring to FIG. 10, the service policy and/or logic is pushed (downloaded) into the network connection capability 60 before it requests the end-system to do a UNI setup. In accordance with this procedure, the network connection capability 60 maps the incoming setup to a corresponding service. This requires encoding a s_id, using known techniques, in the setup from the calling party.

At step 1 in FIG. 10, a service request is made to the service control 58, which then may send an expect setup message to the service customer 18 at step 1.5. The service control 58 pushes the policy and/or logic to control the network connection capability 60 at step 2. At step 3, the service control 58 requests that the service customer 10 initiate a UNI setup containing the s_id. The UNI setup is directed from the customer 10 to the SVC controller 20 (located within the network connection capability) at step 4. Because multiple customers may initiate multiple SVC's corresponding to a single service, the s_id functions to identify the service and the SVC instance for the particular customer.

At step 5, a proxy UNI is sent to the edge switch 12. As a result, PNNI is transmitted across the network at step 6, causing the forwarding of a proxy UNI to the SVC controller 22 (located within the network connection capability) at step 7. Thereafter, step 8 is performed to initiate UNI to the service customer 18. The reply messages from the service customer 18 to the service customer 10, which include, for example, connect messages (not pictured), essentially follow a reverse path through the network connection capability 60. Data paths are thus established through the ATM network to connect the service customer 10 and the service customer 18. Alternatively, the SVC controllers 20 and 22 are integral with the ATM edge switches 12 and 16, respectively, eliminating the need for proxy steps 5 and 7.

In order for the customer to map the incoming UNI setup to an application, either the setup contains an application identifier or the service control 58 may alert the service customer 18 of the incoming UNI and its virtual path identifier/virtual channel identifier (VPI/VCI), illustrated in FIG. 10 as step 1.5. If the application identifier and service identifier are the same, the s_id can be used. However, because this may not be the case, a different identifier is preferably used.

Figure 11:
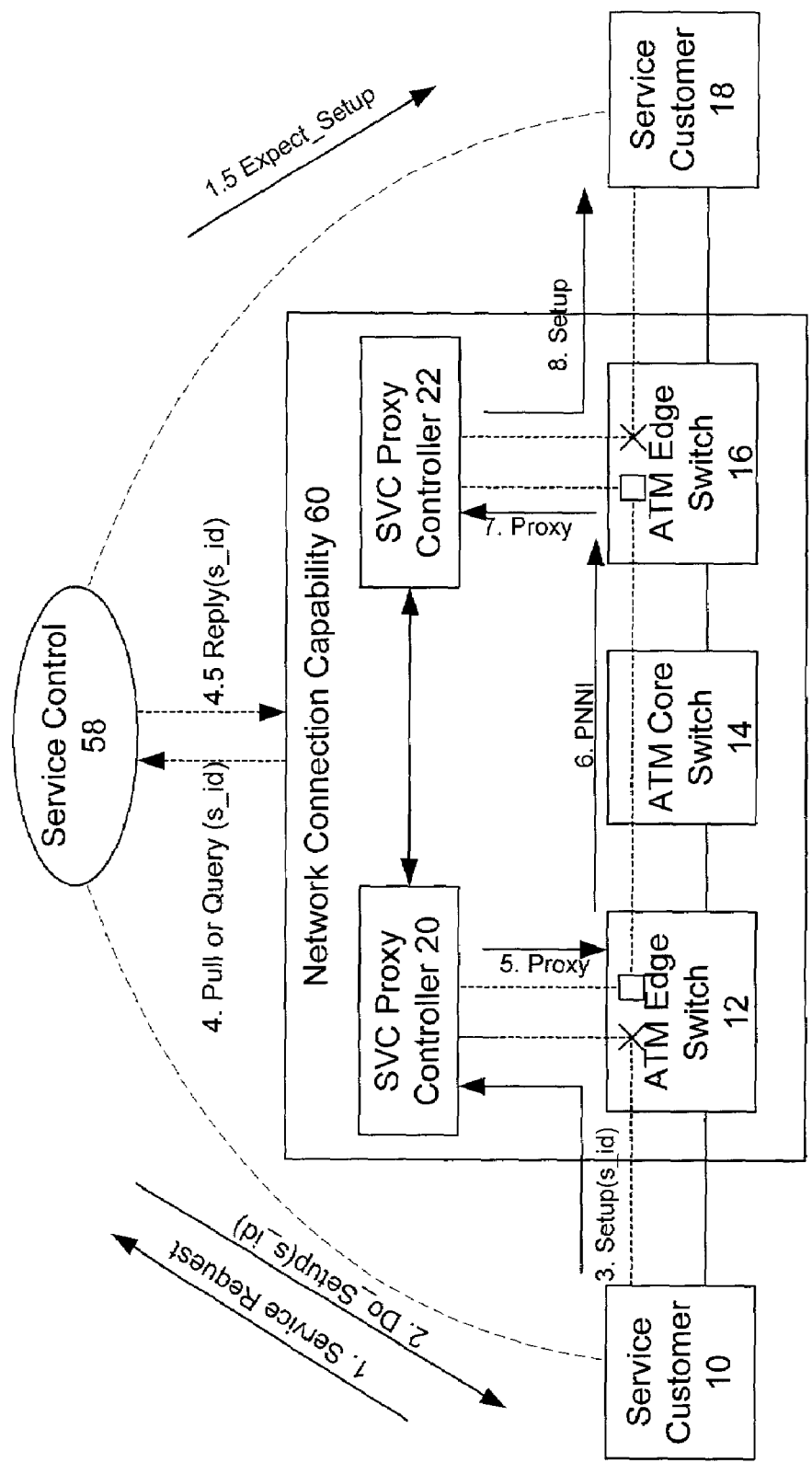
FIG. 11 illustrates an operation chart for a pull method and a query method in an ATM network performed in accordance with the instant invention.

FIG. 11 depicts an exemplary embodiment in which the network connection capability 60 pulls in the service policy and/or logic. At step 1, a service request is made to the service control 58. The service control 58 may send an expect setup message to the service customer 18 at step 1.5. At step 2, the service control 58 requests that the service customer 10 initiate a UNI setup containing s_id. The UNI setup is directed at step 3 from the customer 10 to the SVC controller 20 and contains the s_id. Because multiple customers may initiate multiple SVC's corresponding to a single service, the s_id functions to identify the service and the SVC instance for the particular customer. Step 4 is then performed, in which the network connection capability 60 pulls the service policy and/or logic from the service control 58, which is completed by the reply provided in step 4.5.

At step 5, a proxy UNI is sent to the edge switch 12. As a result, PNNI is used to establish an SVC across the network at step 6, which results in a proxy UNI to the SVC controller 22 at step 7. Thereafter, step 8 is performed to initiate UNI to the service customer 18. The reply messages from the service customer 18 to the service customer 10, which include, for example, connect messages (not pictured), essentially follow a reverse path through the network connection capability 60. Data paths are thus established through the ATM network to connect the service customer 10 and the service customer 18. As in the push procedure, the setup may contain an application identifier or the service control 58 may alert the service customer 18 at step 1.5 of the incoming UNI and its associated VPI/VCI.

FIG. 11 also depicts an exemplary embodiment in which the network connection capability 60 queries service control 58 for the service policy and/or logic. The query procedure includes a query at step 4 and a response at step 4.5. In the case of a setup, the response contains information indicating whether the setup should go through and under what conditions. It is noted that in the exemplary pull and query procedures depicted by FIG. 11, the interaction between the network connection capability 60 and the service control 58 must be timely, in order to avoid a time out condition. Further, the s_id is needed in the setup that uniquely identifies the service. The query procedure differs from the pull procedure in that the service policy and/or logic is not downloaded to the network connection capability 60. Therefore, pursuant to the query procedure, the service is not constrained by the capabilities of the SVC controllers 20 and 22, for example, which must interpret the actual service policy and/or logic in the pull procedure.

Figure 12:
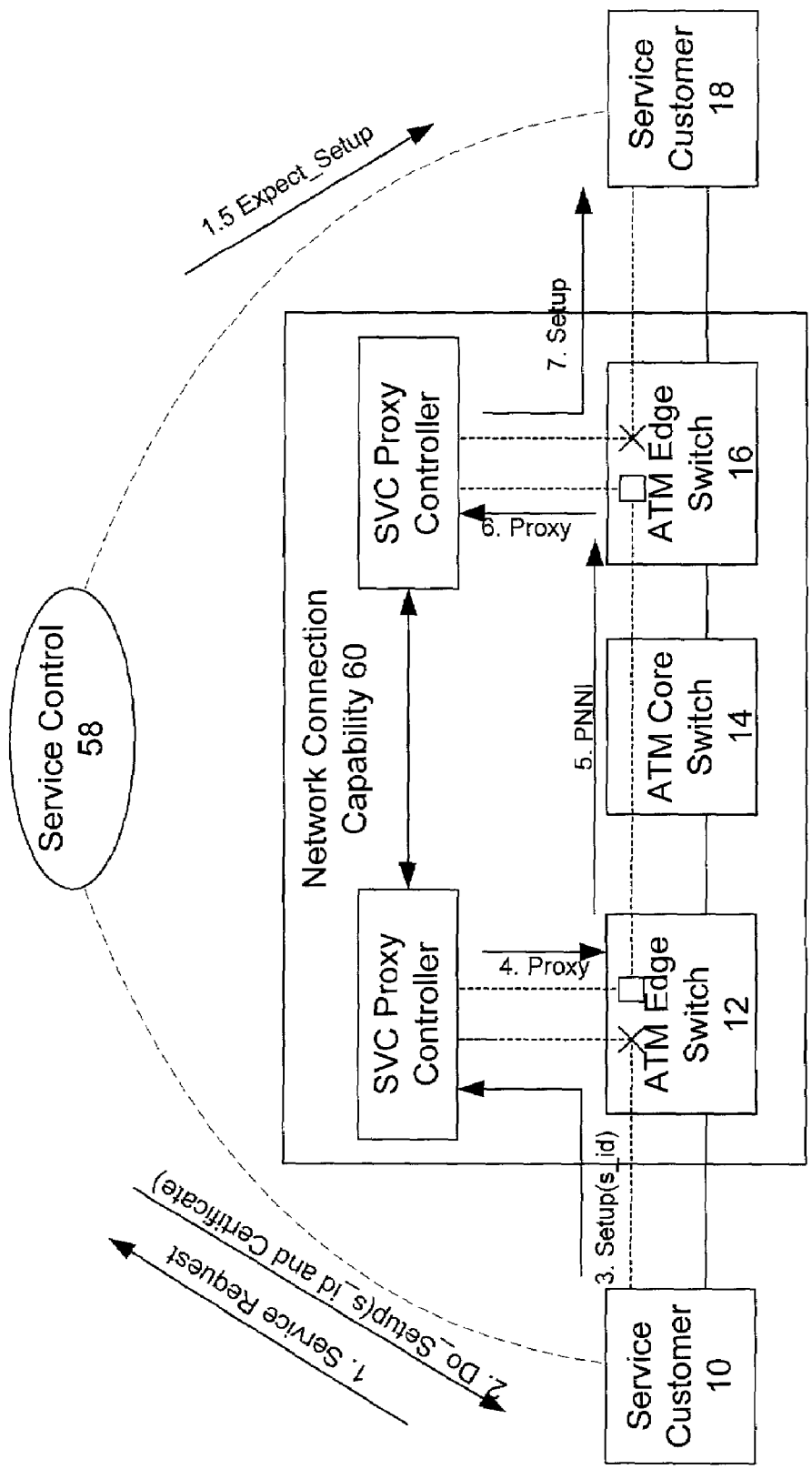
FIG. 12 illustrates an operation chart for a method using certificates in an ATM network performed in accordance with the instant invention.

FIG. 12 depicts an exemplary embodiment in which the service control 58 provides the service customer 10 with a certificate allowing it to perform a permitted setup. The certificate specifies permitted setup parameters and/or other policy and logic to be applied to the setup. The service customer 10 includes the certificate in its setup message. The network connection capability 60 therefore does not need to consult the service control 58 in order to allow the setup. The certificate uniquely identifies which service allowed the setup, so that billing and accounting can be properly performed when this procedure is used with third parties. As discussed above, the certificate may be encrypted and sequenced to prevent unauthorized and/or repeat use.

Referring to FIG. 12, a service request is initially made to the service control 58 at step 1. The service control 58 may send an expect setup message to the service customer 18 at step 1.5. At step 2, the service control 58 requests at that the service customer 10 initiate a certificate and a UNI setup containing s_id. The UNI setup (containing the s_id and certificate) is directed at step 3 from the customer 10 to the SVC controller 20. At step 4, a proxy UNI is sent to the ATM edge switch 12. As a result, PNNI is transmitted across the network at step 5, which results in a proxy UNI being sent to the SVC controller 22 at step 6. As in the push method shown in FIG. 10, the service control 58 may alert the service customer 18 of the incoming UNI and its VPI/VCI at step 1.5, or the setup may contain an application identifier. Thereafter, step 7 is performed to initiate UNI to the service customer 18. The reply messages from the service customer 18 to the service customer 10, which include connect messages (not pictured), for example, essentially follow a reverse path through the network connection capability 60. Data paths are thus established through the ATM network to connect the service customer 10 and the service customer 18.

There are many other possible implementations of the connection setup request signaling, as well as the network connection capability, according to various embodiments of the present invention. In addition to the exemplary IP and ATM implementations discussed above, the network connection capability 60 may be implemented using multi-protocol label switching (MPLS). There are currently two protocols for signaling connections across an MPLS network: RSVP-te and constraint-based routed label distribution protocol (CR-LDP). RSVP-te or CR-LDP may be used to implement the user-to-network interface signaling (between the service customers 10 and 18 and the network connection capability 60), the signaling to setup the connection across the MPLS network, or both. Other possible implementations of the network connection capability 60 include optical and TDM switching networks, such as those controlled by generalized MPLS (GMPLS).

The foregoing discussion has been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It is also noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writeable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

In addition, although the present specification describes components and functions implemented in the embodiments with reference to particular standards and protocols, the invention is not limited to such standards and protocols. The standards for Internet and other packet-switched network transmission (e.g., SIP, SDP, RSVP, MPLS, GMPLS, CR-LDP, RSVP-te, TCP/IP, UDP/IP, HTML, SHTML, DHTML, XML, PPP, FTP, SMTP, MIME); peripheral control (IrDA; RS232C; USB; ISA; ExCA; PCMCIA); and public telephone networks (ISDN, ATM, xDSL) represent examples of the state of the art. Such standards are periodically superseded by faster or more efficient equivalents having essentially the same functions. Replacement standards and protocols having the similar functions are considered equivalents.

We claim:

1. A system for controlling access to a communications network associated with a network service, the system comprising:

a service controller, comprising at least one session initiation protocol (SIP) proxy server, that receives a request for the network service from an initiating end system to access the network service, provides the initiating end system with an enabling certificate, comprising information relating to the permitted setup, and service policy or logic representing service capabilities or service permissions, associated with the network service, and a unique setup identifier, and instructs the initiating end system to perform a connection setup request that includes the certificate and the unique identifier; and at least one switching device that receives the connection setup request from the initiating end system, the switching device processing the connection setup request based on the certificate and the unique identifier and performing one of establishing a network connection and rejecting the connection setup request based on the processing, in accordance with at least the certificate.

2. The system according to claim 1, the at least one switching device comprising an Internet protocol router.

3. The system according to claim 2, in which the connection setup request is in accordance with resource reservation protocol (RSVP).

4. The system according to claim 1, the at least one switching device comprising a multi-protocol label switching (MPLS) label switching router.

5. The system according to claim 4, in which the connection setup request is in accordance with one of RSVP-te and constraint-based routed label distribution protocol (CR-LDP).

6. The system according to claim 1, the at least one switching device comprising an optical switching device controlled by general multi-protocol label switching (GMPLS).

7. The system according to claim 6, in which the connection setup request is in accordance with one of RSVP-te and constraint-based routed label distribution protocol (CR-LDP).

8. The system according to claim 1, the at least one switching device comprising a time division multiplexing (TDM) switching device controlled by generalized multi-protocol label switching (GMPLS).

9. The system according to claim 8, in which the connection setup request is in accordance with one of RSVP-te and constraint-based routed label distribution protocol (CR-LDP).

* * * * *